United States Patent
Woolgar

Patent Number: 5,285,831
Date of Patent: Feb. 15, 1994

[54] DADO DITTO

[76] Inventor: Clark L. Woolgar, 6209 W. Georgia Ave., Glendale, Ariz. 85301

[21] Appl. No.: 763,453

[22] Filed: Sep. 20, 1991

[51] Int. Cl.⁵ .................................................. B27C 5/00
[52] U.S. Cl. ................................ 144/1 F; 144/134 D; 144/136 C; 144/137
[58] Field of Search .................... 144/1 E, 1 F, 134 D, 144/136 C, 137, 144 R, 144.5, 372, 371; 409/182; 33/42, 562, 571, 197

[56] References Cited

U.S. PATENT DOCUMENTS 3,450,001  6/1969  Fortune ........................ 144/136 C
4,921,023  5/1990  Pempek ........................ 144/136 C

*Primary Examiner*—W. Donald Bray

[57] ABSTRACT

This invention is an attachment mountable to the underside of a router by means of which dados (grooves) may be accurately cut in a work-piece uniformly and equidistant from the previous dado without any adjustment to the attachment. The initial dado may or may not be parallel to the edge of the material.

The attachment consists of two plates. The top plate has predrilled holes for fastening it to the router. There are also predrilled holes in the top plate for the router bit and for the fasteners used to bolt the two plates together. The lower plate has an elongated hole for the router bit to pass thru in the various settings. The lower plate also has four other narrower elongated holes used in fastening the two plates together in the various settings.

A follower of the desired size is fastened by screws to the lower base plate to control the distance between the dado being cut and the previous dado. The follower (guide) has a tapered front end to alleviate the necessity of cleaning the dado of router chips before running the next dado. Equal and equidistant details and cuts can also be made.

5 Claims, 5 Drawing Sheets

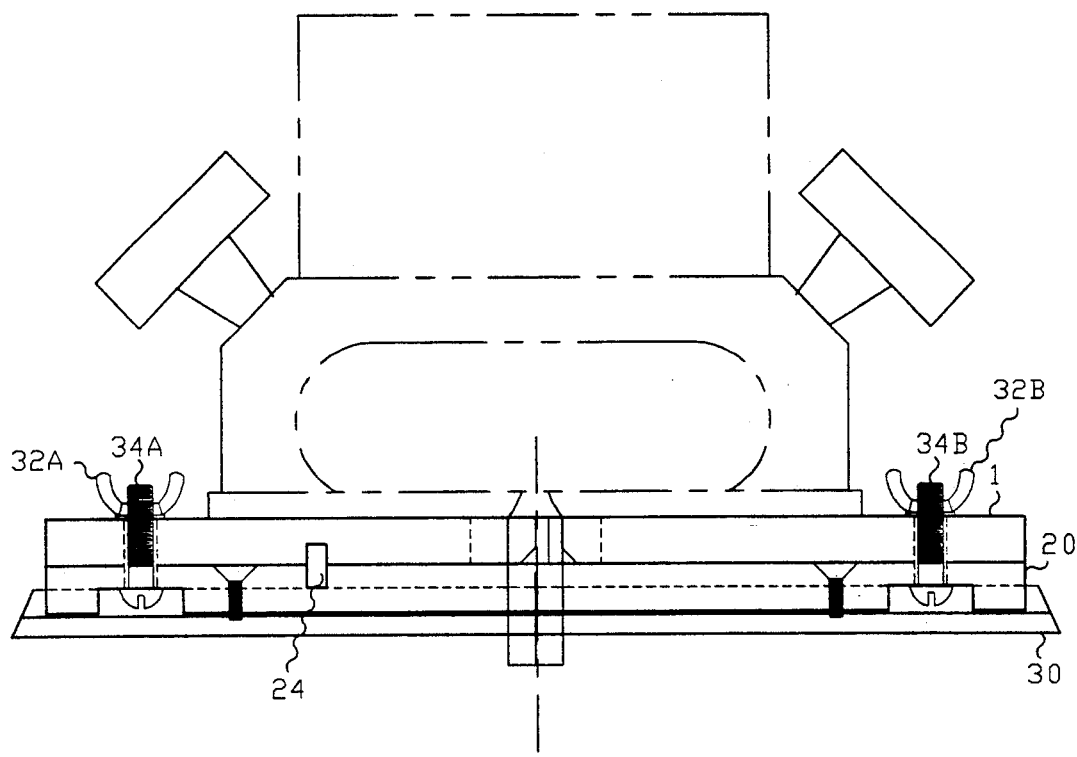
FIG. 3-A

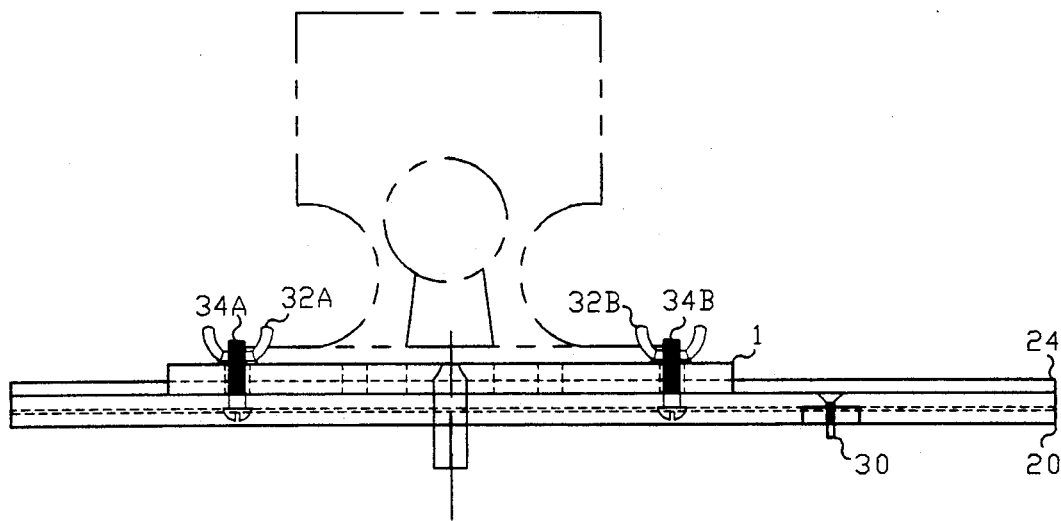
FIG 3-B

DADO DITTO

FIELD OF INVENTION

Since routers are the tool most often used to cut grooves or dados in a piece of material there have been several guides developed to aid in this work. Without a guide of some sort, it would be virtually impossible to control a manual router with the degree of accuracy required.

BACKGROUND OF THE INVENTION

Since most cabinet shops and other carpentry related businesses operate on a job shop basis, as apposed to an assembly line type operation, the slant of most guides is solely related to accuracy and position of the groove or dado. This is understandable since subsequent assembly operations are completely dependent on these factors. However in these days where the owner and/or operator of the business is faced with competitive pricing and a scarcity of dedicated skilled personnel it is of the essence to make each operation as simple as possible including reducing or eliminating the need for any additional handling, measuring, and indeed thinking.

SUMMARY OF THE INVENTION

The dado ditto, our name for this unique router attachment, meets all the requirements for a highly desirable production tool. It is light weight, durable, simple to set up and operate. In addition it is relatively inexpensive to produce and easy to maintain. It makes possible an assembly line production of identical parts. By making it possible to finish any number of equal size and equidistant grooves or dadoes on a piece of material without any adjustments or changes to the router attachment this operation is no longer the bottleneck it was before.

The attachment consists of two plates. There are holes in the top plate to facilitate fastening it to the underside of the router. Other holes in the top plate accommodate the router bit and fasteners for positioning and securing the bottom plate. The lower plate has elongated holes for both the router bit and the fasteners to enable the operator to set it for various distances between the grooves or dados. Once the follower is fastened in the desired position the distance and accuracy of each successive groove is automatic.

The object of the invention, generally stated, is the provision of a router guide attachment to permit the ordinary router operator with the ability to make equal and equidistant grooves or dadoes in a piece of material. There is no limitation, such as being parallel to the edge of the material. The initial groove determines the angle of all subsequent grooves. The follower, which has a tapered front end, even eliminates the need for cleaning chips from one groove before cutting another. For a more complete understanding of the nature and scope of this invention we present the following drawings and explanations.

BRIEF DESCRIPTION OF THE DRAWINGS

FIG. 3A is an end view of the entire attachment
FIG. 3B is an end view of the entire attachment

Figure 1:
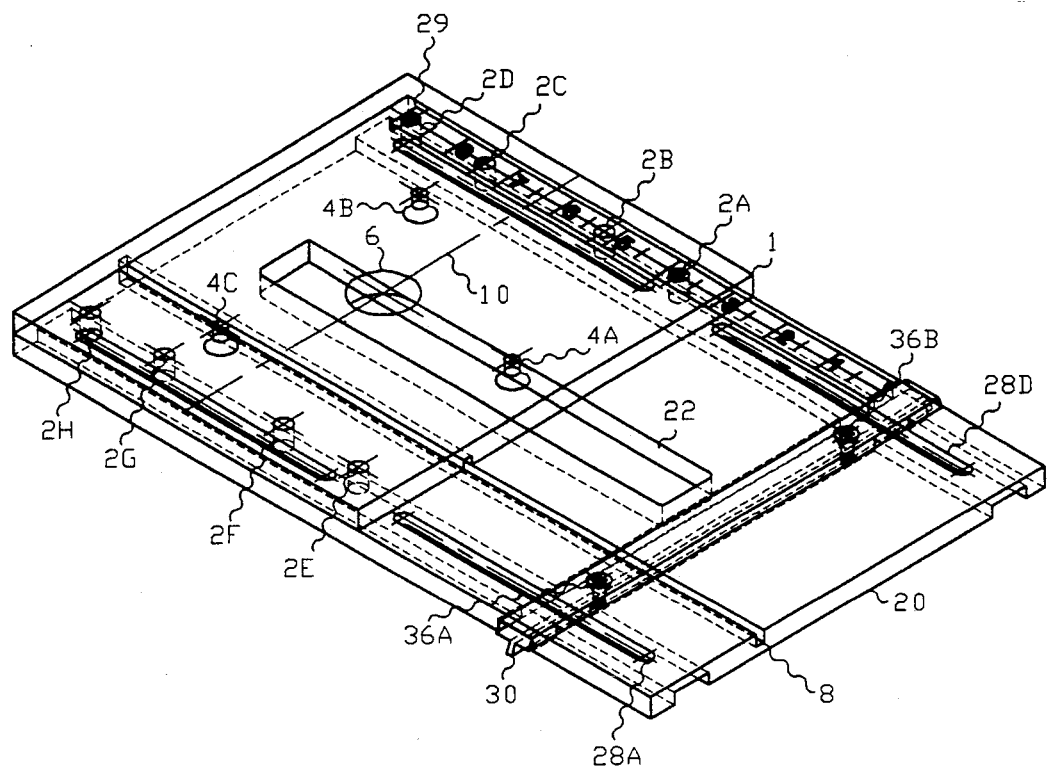
FIG. 1 is a plan view of the top base plate-1

Scored line 10 is used in centering the router bit in hole 6. The groove 8 will slip over the track 24 (shown in FIG. 2) which keep the top base plate 1 and bottom base plate 20 parallel and stable when in use.

Figure 2:
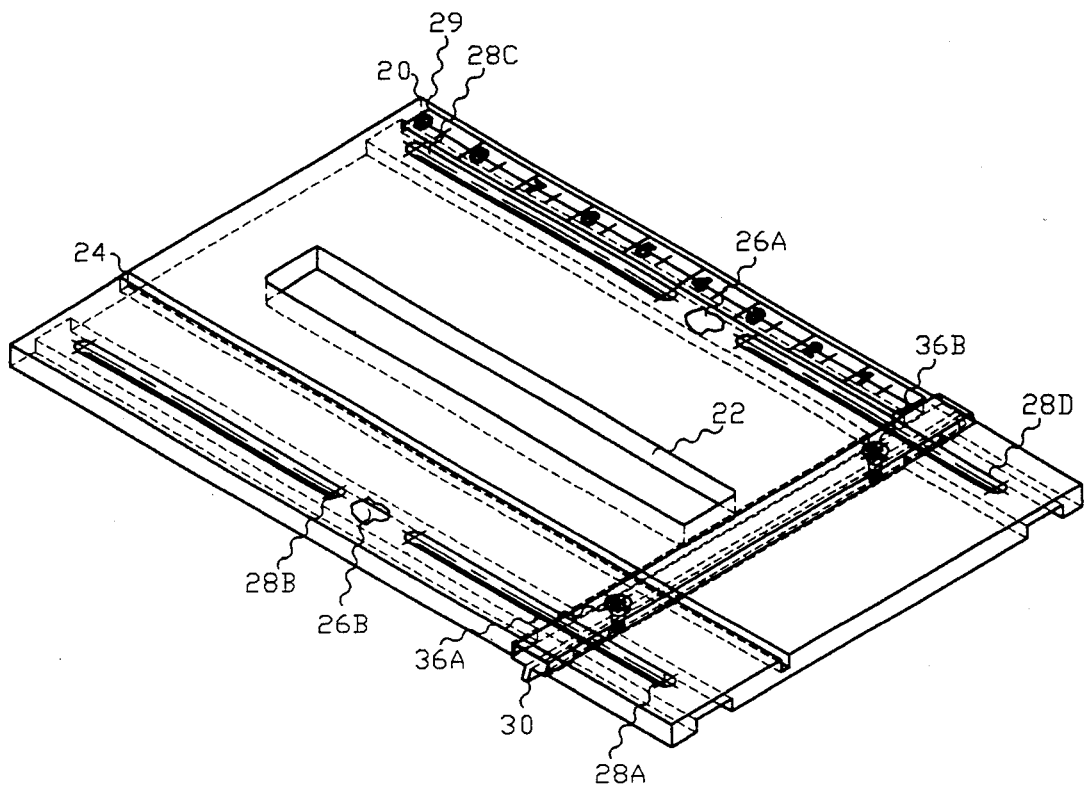
FIG. 2 is a plan view of the bottom base plate-22
Figure 4:
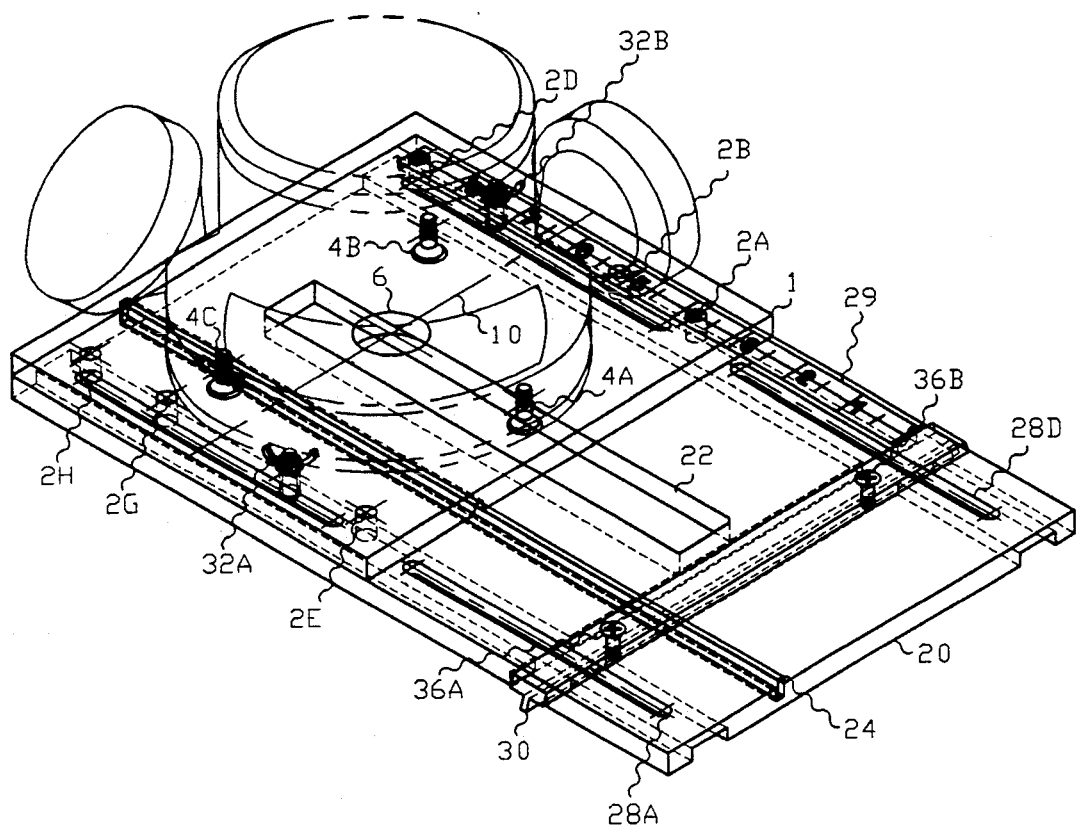
FIG. 4 is a perspective view of the entire attachment FIG. 1, a plan view of top base plate 1, shows the predrilled holes 4A, 4B and 4C which are used for mounting the router base to the top base plate 1. Also shown are holes 2A thru 2H which are bolt holes for bolts 34A and 34B (shown in FIG. 3). Hole 6 drilled in the center is for the router bit to pass thru the top base plate (and then thru elongated hole 22 as shown in FIG. 3).

FIG. 2, a plan view of base plate 20 shows the elongated hole 22 and track 24 as mentioned above. Also shown are elongated holes 28A thru 28D used in setting up the distance between dados. The webbing (bridge) 26A and 26B are designed to strengthen the bottom base plate 20. Elongated holes running the entire length would tend to wear and weaken the fixture in operation.

The ruler 29 is used for easy setting from the center of the follower 30 being used to the center of the selected router bit.

The machine screws 36A and 36B are used to fasten the follower 30 in place.

FIGS. 3A and 3B show the assembled fixture fastened together with bolts 34A and 34B and wing nuts 32A and 32B. You will note the follower 30 has a beveled edge on each end to clean out the last dado run while making the current dado.

To better understand the operation let us describe, in detail, a sample situation.

We need fifty boards with twelve dados in each board. All dados are to be ¼" deep, ⅜" wide and 3" on center.

Insert a ⅜" router bit into the router. Mount the router base to the top base plate 1 using screw holes 4A, 4B, and 4C using the regular screws that come with the router.

Then place the top base plate 1 on the bottom base plate 20 so that the dado 8 on the bottom of the top base plate 1 slips onto the track 24 on top of the bottom base plate 20.

This will automatically line up bolt holes 2A and 2H with the elongated holes 28A and 28D. Next slip bolts 32A and 32B thru elongated holes 28A and 28D and on thru holes 2A and 2H. Screw on wing nuts 32A and 32B but do not tighten completely. Line up the scored line 10 with the 3" mark on the ruler 29. Now is the time to tighten the wing nuts 32A and 32B.

Put the router motor, which has the ⅜" router bit in it, onto the router base and run the router bit thru the router bit hole 6 and on thru the elongated hole 22. The router bit should be set to stick out ¼" below the bottom base plate 20. Tighten the router base to the router motor.

Select a ⅜" follower and mount it in place with the screws 36A and 36B.

Turn the router on and let the follower 30 slide along the edge of the board as you cut your first dado. Each successive dado can be cut by simply putting the follower in the last dado cut and making another pass. In this way you can complete all the dados on one board before you pick up the next board. All dados will be perfectly uniform and equidistant.

This is not an "untried" invention. The inventor has used his own invention in his professional work as a cabinet maker. One of the many advantages is that it is not difficult or complicated to use. Any person capable of operating a router can use this device to full advantage.

You are not limited to making dados parallel to the edge of the work surface. Only the first dado must be run at whatever angle is desired. After that it is all automatic. To state it another way, if slanted dados are desired the only one that has to be measured, in any way, is the first one cut.

Once the first dado has been run and the distance set between dados, you do not have to set up, rehandle or mess up any production item.

This device can be used to make other uniform cuts or details in the shop or in the field.

While the above descriptions contain many specifications, these should not be construed as limitations on the scope of the invention.

Accordingly the scope of the invention should be determined, not by the embodiments illustrated, but by the appended claims and their legal equivalents.

What is claimed is:

1. A guide attachment adapted to be mounted to the underside of a router and comprising;

a generally top plate member having a router blade opening centrally located in said top plate;

a lower plate with an elongated router blade opening located and sized to coincide with said blade opening in said top plate in selected settings;

fastener means for said top plate and said bottom plate positioned and shaped for releasably securing said top plate to said bottom plate in selected positions;

scale indicia on said lower plate corresponding to the perpendicular distance between the center of the follower and the center of said blade opening in said top plate;

follower slot in said lower plate extending across said lower plate at a right angle to said scale indicia.

2. A guide attachment adapted to be mounted to the underside of a router and comprising;

a generally rectangular top plate member having a router blade opening centrally located in said top plate;

a generally rectangular lower plate with an elongated router blade opening located and sized to coincide with said blade opening in said top plate in selected settings;

fastener means for said top plate and said bottom plate positioned and shaped for releasably securing said top plate to said bottom plate in selected positions;

scale indicia on said lower plate corresponding to the perpendicular distance between the center of the follower and the center of said blade opening in said top plate;

follower slot in said lower plate extending across said lower plate at a right angle to said scale indicia.

3. The attachment in claim 2 wherein said top plate and said bottom plate is formed of transparent sheet material of the same gauge.

4. The attachment in claim 2 wherein said top plate has a reference line which relates to said follower and is alignable with said scale indicia on said lower plate.

5. The attachment in claim 2 wherein said follower is secured by two screws projecting upward through the recessed groove in said lower plate.

* * * * *